M. ROBINSON.
JUNCTION OR OUTLET BOX.
APPLICATION FILED JULY 29, 1911.
1,208,660.
Patented Dec. 12, 1916.
3 SHEETS—SHEET 1.
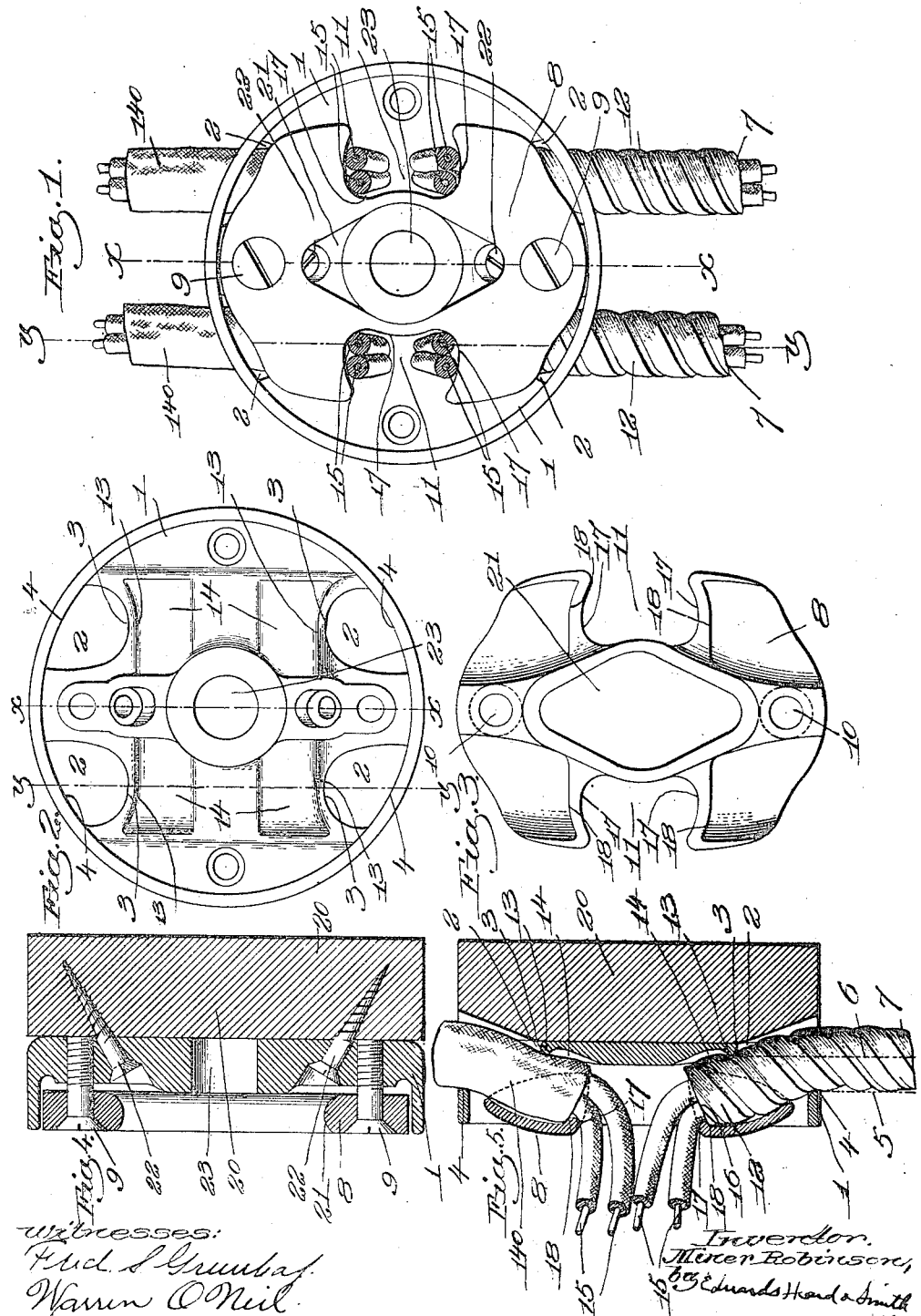

M. ROBINSON.
JUNCTION OR OUTLET BOX.
APPLICATION FILED JULY 29, 1911.
1,208,660.
Patented Dec. 12, 1916.
3 SHEETS—SHEET 2.
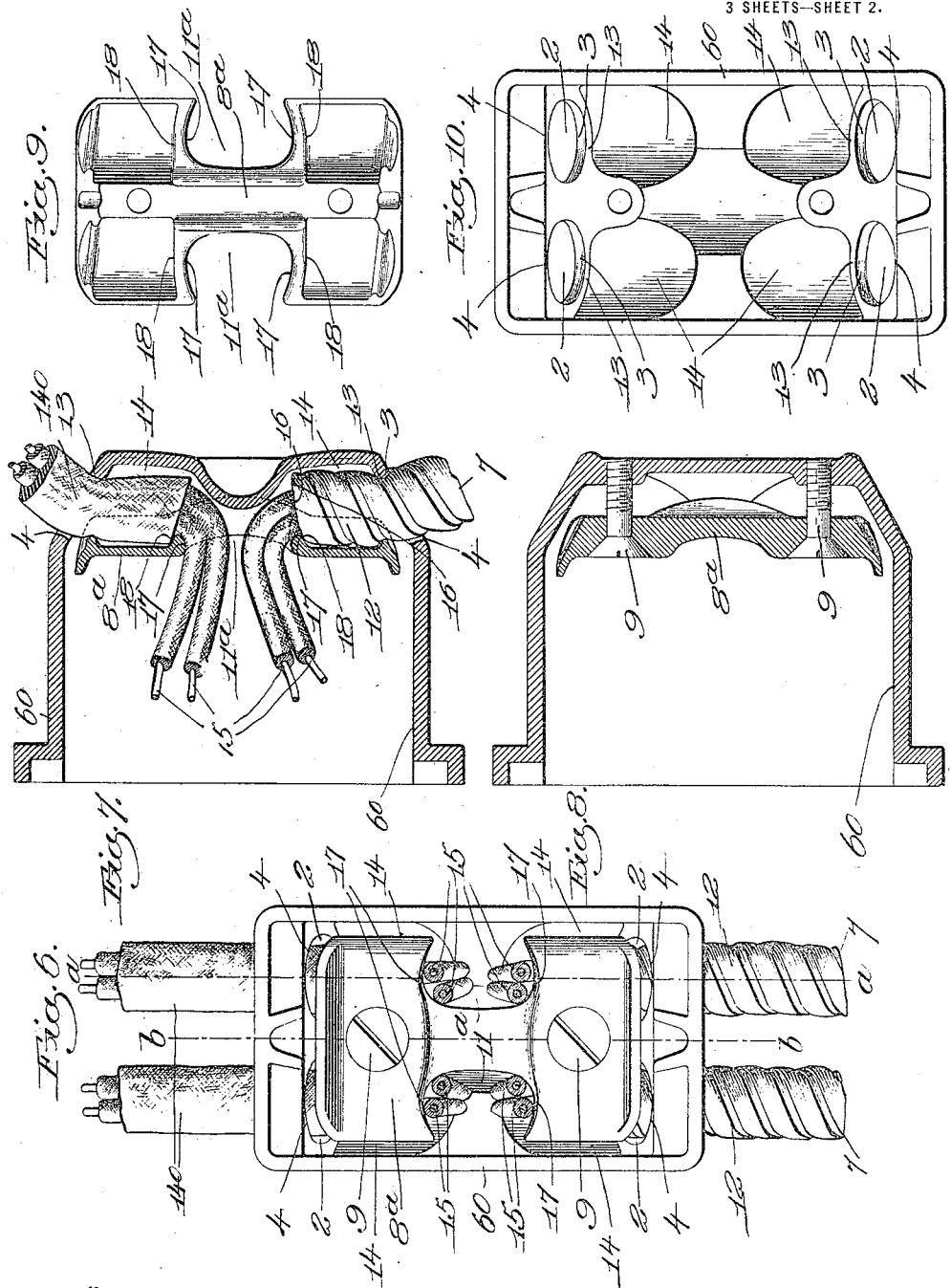

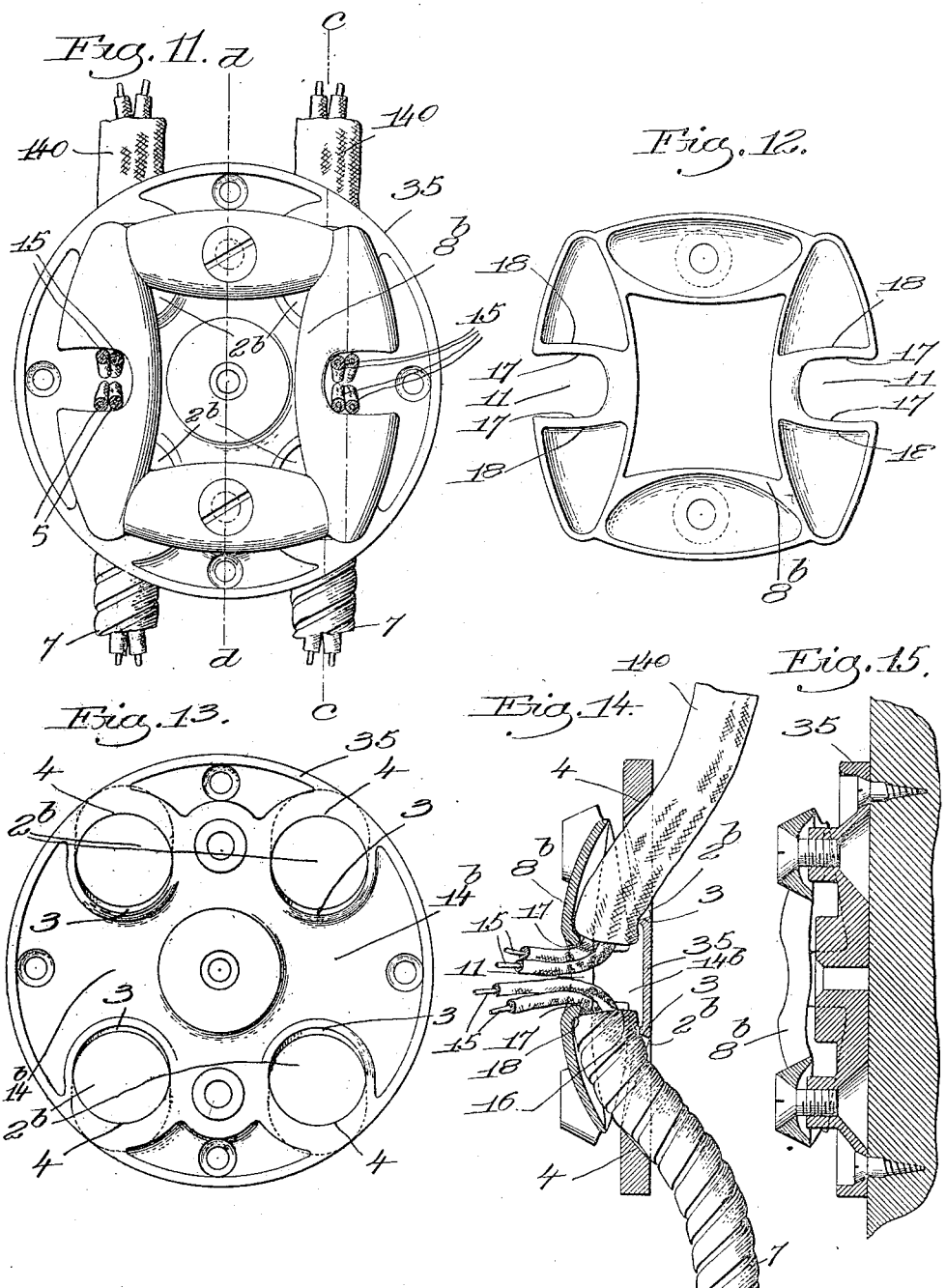

UNITED STATES PATENT OFFICE.

MINER ROBINSON, OF NEWTON, MASSACHUSETTS.

JUNCTION OR OUTLET BOX.

1,208,660. Specification of Letters Patent. Patented Dec. 12, 1916.

Application filed July 29, 1911. Serial No. 641,340.

*To all whom it may concern:*

Be it known that I, MINER ROBINSON, a citizen of the United States, and resident of Newton, county of Middlesex, State of Massachusetts, have invented an Improvement in Junction or Outlet Boxes, of which the following description, in connection with the accompanying drawing, is a specification, like characters on the drawing representing like parts.

This invention relates to junction, switch or outlet boxes and particularly to the means for holding the conduit end in the box.

Outlet or junction boxes are commonly made with conduit-receiving apertures through which the conduit ends are inserted, and it is customary to provide some kind of a clamping device for clamping the conduits in the box. These boxes are usually placed in walls so that the conduits enter them in a vertical direction, and usually two or more conduits are led into the same box. With the constructions now commonly used it frequently happens that when the clamp is loosened in order to make a readjustment of the wiring, the weight of the portion of the conduits which hang down from the box is very likely to draw them down out of the openings in the box and down in the wall, thus necessitating the labor of fishing the conduits up again and inserting them into the box.

One object of my invention is to provide a construction which permits the conduits to be readily inserted in the aperture in the outlet box, but which will hold the conduits so that they will not drop down out of the box by their own weight, even when the clamp is removed.

Another object of my invention is to provide a novel construction which will permit the clamp to engage and apply a clamping pressure to a plurality of conduits entering the box from different directions, even though the conduits are not exactly of the same size, and still another object is to provide a novel clamp having wire-receiving apertures provided with rounded bearing edges over which the wires are drawn and which prevent the wire from being bent over the sharp edge of the armor of the conduit; and other objects of my invention are to improve generally outlet boxes of this nature, all as will be more fully hereinafter described and then pointed out in the appended claims.

Referring to the drawings, Figure 1 is a front view of a circular outlet box provided with my invention and showing the conduits clamped thereinto; Fig. 2 is a plan view of the box; Fig. 3 shows the clamp; Fig. 4 is a section on the line $x$—$x$, Figs. 1 and 2; Fig. 5 is a section on the line $y$—$y$, Figs. 1 and 2; Fig. 6 is a front view of a different form of a switch box having my invention applied thereto; Fig. 7 is a section on the line $a$—$a$, Fig. 6; Fig. 8 is a section on the line $b$—$b$, Fig. 6; Fig. 9 is a view of the clamp; Fig. 10 is a plan view of the switch box shown in Fig. 6; Fig. 11 is a view of an outlet plate and clamp therefor; Fig. 12 is a view of the clamp for said plate; Fig. 13 is a view of said outlet plate; Fig. 14 is a sectional view on the line $c$—$c$, Fig. 11; Fig. 15 is a section on the line $d$—$d$, Fig. 11.

My outlet box is provided with the usual conduit-receiving apertures, but the apertures are led obliquely through the wall of the box and are so formed that the distance between opposite edges thereof in a direction perpendicular to the length of the conduit is less than the diameter of the conduit so that the conduit is provided with a bend at or near the point where it enters the box, and is thus gripped by the edges of the opening.

My invention may be applied to different types of outlet boxes, and in Figs. 1 to 5 I have shown it as it would be in connection with an ordinary circular outlet box which is shown at 1. This outlet box is provided with a plurality of conduit-receiving holes 2 which extend obliquely through the bottom of the box, preferably near the corner thereof, and are formed in such a way that the distance between the edge 3 and the edge 4 of each aperture in a direction perpendicular to the length of the conduit 7 is less than the diameter of the conduit. In other words, if two lines are drawn through the edges 3 and 4 in a direction parallel to the length of the conduit, as shown by the dotted lines 5 and 6, Fig. 5, the distance between these lines will be less than the diameter of the conduit. When, therefore, the conduit 7 is inserted into the aperture 2, a bend will be formed in the conduit at or near the point where it enters the aperture, due to the weight or pull of the conduit, and the conduit will be gripped between the two edgs 3 and 4, as shown in Fig. 5. I propose to so make the aperture that the grip which the edges 3 and 4 will have on the conduit will be sufficient to prevent the latter from pulling out from the outlet box even though no other means are employed for holding the conduit in the box. I prefer, however, to provide a clamp for clamping the conduits in the box, and a clamp adapted for the circular box is shown at 8 and is arranged to cover the ends of the conduits entering the box and to be held in place by screws 9 that pass through the apertures 10 formed in the clamp and into the bottom of the box. This clamp is provided with wire-receiving passages 11 through which the wires may be drawn.

Where a plurality of conduits enter the box it is desirable that the clamp 8 should engage all the conduits with a proper clamping pressure, but where the conduits are of the well known "B. X." type (this being the trade term for the armored conduit shown in Fig. 1), it would be difficult to apply a proper clamping pressure to each one of the four conduits if the conduits rested flatly against the bottom of the box because the conduits are apt to vary a little in size, and owing to the stiff character of the armor 12 the clamp would be likely to apply pressure to one or more only of the conduits, thus leaving some of the conduits insecurely fastened or clamped, they receiving only a small portion of the total pressure exerted.

One object of my invention is to provide a construction in which there is an ample working margin for the operation of the clamp whereby the total pressure exerted by the clamp is divided as equally as possible between the several conduits so that each conduit will receive approximately the same pressure, and so that the clamp will always engage all four of the conduits even though they vary more or less in size. I secure this end herein by providing each box with a raised portion at or near the opening 2 against which the conduit rests and by making the box beyond said raised portion lower than said portion so that the conduit can be bent over the raised portion and down into said depression by the clamp. In this way all the conduits will be subjected to clamping pressure, even though they vary somewhat in size. In Figs. 1 to 5 this raised portion is shown as rib 13 adjacent the edge of the opening 2, although it would be within my invention to place the rib at any point within the box. Beyond the rib the bottom of the box is made lower than the top of the rib, as shown at 14, and this may be conveniently done by forming a recess in the bottom of the box. When the conduits are entered into the box, therefore, the conduits all rest against the raised portions 13, and when the clamp 8 is applied the conduit ends are bent over the raised portions 13 slightly, as clearly seen in Fig. 5, the recesses 14 permitting this as will be readily observed. By this construction all four conduits will be firmly clamped in the outlet box, and the pressure of the clamp against all the conduits is substantially equalized. Another advantage of this construction is that the B. X. conduit and the conduit of the "loom" type can both be clamped in the same box, (by "loom" conduit is meant a non-metallic conduit in which the insulation is braided or otherwise woven by a circular loom. This type of conduit is shown at 140 at the upper part of Fig. 5). This is so because when the clamp is applied it will engage the ends of the conduits and bend them all over the raised portions 13, thus bringing the clamping pressure to bear on each conduit regardless of its character or size.

In using the B. X. conduit the ends of the wires 15 extend some distance beyond the end of the armor 12 and the rules of the fire underwriters require that the rough edge 16 of the armor should be protected so that the wires 12 cannot be bent over said edge and cut and injured thereby.

In my improvement I make the edges 17 of the wire-receiving apertures 11 of the clamp rounded and smooth, and these rounded edges form the edges over which the wires 15 are bent and serve to prevent the wire from being bent over the rough edge 16. Said rounded edges 17, therefore, constitute protecting edges which meet the requirements relative to protecting the sharp edge 16. These rounded edges on the clamping member together with the rounded edge of the box not only serve to protect the wire from abrasion as above described, but also to limit the distance which the wires can be bent toward the sharp edge of the armor, thereby preventing the wire being drawn in any manner dangerously near the sharp edges of the armor. These edges together with all adjacent edges of the box are carefully rounded so that they in themselves will not form any sharp or abrasive surface to injure the insulation on the wire and by limiting the motion as above described they also prevent the sharp edges of the armor from coming in contact with the rubber insulation of the wire and causing any damage thereby.

In order to assist in properly positioning the B. X. conduit in the box I have made my clamp with the shoulder 18 which forms a sort of stop shoulder and which limits the extent to which the armor may be inserted into the box.

In Figs. 6 to 10 I have shown my invention as it would be applied to a square or oblong switch box 60. In this embodiment the openings 2 into the box have the characteristics above referred to, that is, the distance between opposite edges 3 and 4 thereof in a direction perpendicular to the length of the conduit is less than the diameter of the conduit, so that the conduit will be gripped between said edges merely by the act of inserting it into the outlet box. Moreover the switch box is formed with the raised portion 13 and with the recess or depression 14 beyond it, so that the clamp 8ª can bend the end of the conduit over the raised portion 13, as shown in Fig. 7. In this embodiment also the clamp 8ª which is of a proper shape to fit the box is provided with the wire-receiving apertures 11ª having the rounded edges 17 which prevent the wire from bending over or being injured by the sharp edge 16 of the conduit armor 12.

The clamp 8 shown in Fig. 3 is of such a shape that when it is applied the screws 22 by which the outlet box is fastened to the studding 20 are exposed sufficiently so that they are accessible, without loosening or removing the clamping member. This is accomplished by making the clamp with the central aperture 21 of the shape shown in Fig. 3, this aperture not only leaving the screws 22 accessible, but also leaving uncovered the central hole 23 through the outlet box through which the gas piping may enter if the house is piped, or a fixture, stud or hickey inserted.

My invention can also be applied to an outlet plate 35 as seen in Figs. 11 to 15, by forming the conduit-receiving apertures 2ᵇ so that they extend obliquely through the plate. In this construction the distance between the edges 3 and 4 of each aperture 2ᵇ in a direction perpendicular to the direction of the conduit 7 is less than the diameter of the conduit so that the conduit will be clamped between said edges as above described. In this construction too the edge 3 of the aperture constitutes the raised portion over which the conduit is bent by the clamp 8ᵇ and because the conduit extends through the plate obliquely, the portion 14ᵇ of the plate beyond the aperture constitutes a depressed portion into which the end of the conduit can be bent by the clamp.

While I have illustrated several embodiments of my invention yet I do not wish to be limited to the construction shown, as I believe I am the first to provide an outlet box or plate or a switch box or junction box with the conduit-receiving aperture extending obliquely through the wall thereof, thereby to secure the clamping effect above described, and I desire to claim this broadly.

By the term "outlet box" as used in the claims I intend to include any outlet, junction or switch box, or an outlet junction plate or any similar electrical appliance.

Having fully described my invention, what I claim as new and desire to secure by Letters Patent is:

1. An outlet box having a conduit-receiving opening through a wall thereof to permit the conduit to be passed obliquely through said opening and to project into the interior of the outlet box, said wall of the outlet box being provided with a raised portion extending laterally therefrom on the interior thereof and transversely to the direction of a conduit entering said opening and situated to be engaged by the portion of the conduit which enters the outlet box, the wall of said outlet box beyond the raised portion being depressed so that the conduit entering the box can be bent over the raised portion.

2. An outlet box having a conduit-receiving opening through the wall thereof to permit a conduit to be inserted obliquely therethrough with an end projecting into the interior of the outlet box, said outlet box being provided with a raised portion extending laterally therefrom on the interior thereof and transversely to the direction of a conduit entering said opening, said outlet box being provided with a recess beyond the raised portion, and a clamp adjustably secured to the wall of the outlet box and adapted to engage the portion of the conduit opposite the recess and bend said conduit over the raised portion.

3. The combination with an outlet box having a conduit-receiving opening and provided with a recess beyond the opening, of a conduit entering said opening and a clamp constructed to engage the end of the conduit and bend the end thereof into the recess and also to cover the end of the conduit armor.

4. The combination with an outlet box having a conduit-receiving opening, of an armored conduit extending into said opening and having the end thereof within the outlet box extending substantially parallel to the bottom of said box, and a clamp to clamp the conduit against the bottom of the outlet box, said clamp covering the end of the armor and having an open-sided wire-receiving passage formed in one side thereof and provided with rounded edges situated beyond the end of the armor which rounded edges prevent the wire from being injured by the rough edge of the armor.

5. The combination with an outlet box having a conduit-receiving opening and a raised portion within the box extending laterally relative to the axis of the opening, of a conduit inserted through said opening and engaging the raised portion and a clamp for clamping the conduit against the raised portion, said clamp having a shoulder to limit the distance which the conduit can be inserted into the opening.

6. The combination with an outlet box having a conduit-receiving opening, of a conduit extending into said opening and having the end thereof within the outlet box extending substantially parallel to the bottom of said box and a clamp to clamp the conduit to the bottom of the outlet box, said clamp being provided with means to limit the distance which the conduit can be inserted into the opening.

7. An outlet box having a conduit-receiving opening through a wall thereof to permit the conduit to be passed obliquely through said opening and to project into the interior of the outlet box, said wall of the outlet box being provided with a raised portion extending laterally therefrom on the interior thereof and transversely to the direction of a conduit entering said opening and situated to be engaged by the portion of the conduit which enters the outlet box, the wall of said outlet box beyond the raised portion being lower than said raised portion so that the conduit entering the box can be bent over the raised portion.

8. An outlet box having a conduit-receiving opening through the wall thereof to permit a conduit to be inserted obliquely therethrough with an end projecting into the interior of the outlet box, said outlet box being provided with a raised portion extending laterally therefrom on the interior thereof and transversely to the direction of a conduit entering said opening, said outlet box being provided with a surface lower than the raised portion beyond the raised portion, and a clamp adjustably secured to the wall of the outlet box and adapted to engage the portion of the conduit opposite the lower portion and bend said conduit over the raised portion.

9. An outlet box having a conduit-receiving opening through a wall thereof to permit the conduit to be passed obliquely through said opening and to project into the interior of the outlet box, said wall of the outlet box being provided with a raised portion on the interior thereof and situated to be engaged by the portion of the conduit which enters the outlet box, the wall of said outlet box beyond the raised portion being lower than said raised portion so that the conduit entering the box can be bent over the raised portion.

10. An outlet box having a conduit-receiving opening through the wall thereof to permit a conduit to be inserted obliquely therethrough with an end projecting into the interior of the outlet box, said outlet box being provided with a raised portion on the interior thereof and situated to be engaged by the portion of the conduit which enters the outlet box, said outlet box being provided with a surface lower than the raised portion beyond the raised portion, and a clamp adjustably secured to the wall of the outlet box and adapted to engage the portion of the conduit opposite the lower portion and bend said conduit over the raised portion.

11. An outlet box having a conduit-receiving opening through a wall thereof to permit the conduit to be passed obliquely through said opening and to project into the interior of the outlet box, said outlet box having a conduit-engaging edge situated to be engaged by the portion of the conduit which enters the outlet box, the interior surface of said wall of the outlet box beyond said edge being situated at a greater distance from the axial line of said conduit than said edge, and a clamp adjustably secured to the outlet box and adapted to engage the portion of the conduit beyond said edge and bend said conduit over said edge.

12. An outlet box having a conduit-receiving opening for armored conduits or cables, a clamping surface, and a clamping member with a wire-protecting edge overlying but not wholly surrounding the end of the conduit armor, said clamping member being opposite said clamping surface.

13. An outlet box having a conduit-receiving opening for armored conduits or cables, a clamping surface, and a clamping member with a wire-protecting edge overlying but not wholly surrounding the end of the conduit armor, said clamping member being opposite said clamping surface, one of said parts having means to limit the distance the conduit may be inserted into the outlet box through said opening.

14. The combination with an outlet box having a conduit receiving opening, of a conduit extending into said opening and having the end thereof within the outlet box extending substantially parallel to the bottom of said box and a clamp to clamp the conduit to the bottom of the outlet box, one of said parts being provided with means to limit the distance which the conduit can be inserted into the opening, said clamp being provided with a wire protecting edge overlying but not wholly surrounding the end of the conduit.

In testimony whereof I have signed my name to this specification in the presence of two subscribing witnesses.

MINER ROBINSON.

Witnesses:
  LOUIS C. SMITH,
  THOMAS J. DRUMMOND.

Copies of this patent may be obtained for five cents each, by addressing the "Commissioner of Patents, Washington, D. C."